United States Patent
Zhang (10) Patent No.: US 10,337,256 B2
(45) Date of Patent: Jul. 2, 2019

(54) POLYCRYSTALLINE DIAMOND CUTTERS HAVING NON-CATALYTIC MATERIAL ADDITION AND METHODS OF MAKING THE SAME

(71) Applicant: DIAMOND INNOVATIONS, INC., Worthington, OH (US)

(72) Inventor: Kai Zhang, Westerville, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 41 days.

(21) Appl. No.: 15/379,883

(22) Filed: Dec. 15, 2016

(65) Prior Publication Data

US 2017/0175453 A1 Jun. 22, 2017

Related U.S. Application Data

(60) Provisional application No. 62/267,979, filed on Dec. 16, 2015.

(51) Int. Cl.
| | | |
|---|---|---|
| *B24D 99/00* | (2010.01) | |
| *B24D 18/00* | (2006.01) | |
| *B22F 3/14* | (2006.01) | |
| *E21B 10/573* | (2006.01) | |
| *C22C 26/00* | (2006.01) | |
| *C04B 35/528* | (2006.01) | |
| *C04B 35/645* | (2006.01) | |
| *B22F 7/08* | (2006.01) | |
| *B22F 5/00* | (2006.01) | |
| *E21B 10/55* | (2006.01) | |

(52) U.S. Cl.
CPC ............ *E21B 10/5735* (2013.01); *B22F 3/14* (2013.01); *B22F 7/08* (2013.01); *B24D 18/0009* (2013.01); *B24D 99/005* (2013.01); *C04B 35/528* (2013.01); *C04B 35/645* (2013.01); *C22C 26/00* (2013.01); *B22F 2005/001* (2013.01); *C04B 2235/3817* (2013.01); *C04B 2235/3852* (2013.01); *C04B 2235/3856* (2013.01); *C04B 2235/40* (2013.01); *C04B 2235/401* (2013.01); *C04B 2235/427* (2013.01); *C04B 2235/5436* (2013.01); *C04B 2235/96* (2013.01); *E21B 10/55* (2013.01)

(58) Field of Classification Search
CPC ........ E21B 10/55; E21B 10/5735; B22F 3/14; B22F 7/08; B22F 2005/001
See application file for complete search history.

(56) References Cited

U.S. PATENT DOCUMENTS

| | | | |
|---|---|---|---|
| 5,310,605 A | 5/1994 | Baldoni, II et al. | |
| 5,649,279 A | 7/1997 | Gustafson et al. | |
| 5,955,186 A | 9/1999 | Grab | |
| 6,217,992 B1 | 4/2001 | Grab | |
| 7,569,179 B2 | 8/2009 | Fang | |
| 7,699,904 B2 | 4/2010 | Fang | |
| 9,476,258 B2 | 10/2016 | Gledhill et al. | |
| 2007/0079994 A1* | 4/2007 | Middlemiss | C04B 35/52 175/426 |
| 2008/0230280 A1* | 9/2008 | Keshavan | C22C 1/05 175/434 |
| 2012/0125696 A1 | 5/2012 | Belnap et al. | |
| 2013/0092452 A1 | 4/2013 | Mukhopadhyay et al. | |
| 2013/0133957 A1 | 5/2013 | Belnap et al. | |
| 2014/0374172 A1 | 12/2014 | Gledhill et al. | |
| 2015/0321318 A1 | 11/2015 | Konovalov et al. | |
| 2016/0325404 A1* | 11/2016 | Long | B24D 18/0009 |

FOREIGN PATENT DOCUMENTS

| | | |
|---|---|---|
| WO | 2013087773 A1 | 6/2013 |
| WO | 2016118739 A1 | 7/2016 |

* cited by examiner

*Primary Examiner* — Pegah Parvini

(57) ABSTRACT

Polycrystalline diamond cutters for rotary drill bits and methods of making the same are disclosed. A polycrystalline diamond compact includes a polycrystalline diamond body having a working surface, an interface surface, and a perimeter surface. The polycrystalline diamond compact also includes a substrate bonded to the polycrystalline diamond body along the interface surface. A non-diamond volume fraction of the polycrystalline diamond body is greater at the interface surface than at the working surface.

22 Claims, 6 Drawing Sheets

FIG. 7

POLYCRYSTALLINE DIAMOND CUTTERS HAVING NON-CATALYTIC MATERIAL ADDITION AND METHODS OF MAKING THE SAME

CROSS-REFERENCE TO RELATED APPLICATIONS

This application claims priority of U.S. Provisional Application No. 62/267,979, filed Dec. 16, 2015, which the entirety thereof is incorporated herein by reference.

TECHNICAL FIELD AND INDUSTRIAL APPLICABILITY

The present disclosure relates generally to cutters made from superhard abrasive materials and, more particularly, to cutters made from polycrystalline diamond having a non-catalytic material addition for enhanced abrasion resistance, and methods of making the same.

BACKGROUND

Polycrystalline diamond ("PCD") compacts are used in a variety of mechanical applications, for example in material removal operations, as bearing surfaces, and in wire-draw operations. PCD compacts are often used in the petroleum industry in the removal of material in downhole drilling. The PCD compacts are formed as cutting elements, a number of which are attached to drill bits, for example, roller-cone drill bits and fixed-cutter drill bits.

PCD cutters typically include a superabrasive diamond layer, referred to as a polycrystalline diamond body that is attached to a substrate. The polycrystalline diamond body may be formed in a high pressure high temperature (HPHT) process, in which diamond grains are held at pressures and temperatures at which the diamond particles bond to one another.

As is conventionally known, the diamond particles are introduced to the HPHT process in the presence of a catalyst material that, when subjected to the conditions of the HPHT process, promotes formation of inter-diamond bonds. The catalyst material may be embedded in a support substrate, for example, a cemented tungsten carbide substrate having cobalt. The catalyst material may infiltrate the diamond particles from the support substrate. Following the HPHT process, the diamond particles may be sintered to one another and attached to the support substrate.

While the catalyst material promotes formation of the inter-diamond bonds during the HPHT process, the presence of the catalyst material in the sintered diamond body after the completion of the HPHT process may also reduce the stability of the polycrystalline diamond body at elevated temperatures. Some of the diamond grains may undergo a back-conversion to a softer non-diamond form of carbon (for example, graphite or amorphous carbon) at elevated temperatures. Further, mismatch of the coefficients of thermal expansion may induce stress into the diamond lattice causing microcracks in the diamond body. Back-conversion of diamond and stress induced by the mismatch of coefficients of thermal expansion may contribute to a decrease in the toughness, abrasion resistance, and/or thermal stability of the PCD cutter during operation.

Accordingly, polycrystalline diamond cutters that exhibit increased toughness, abrasion resistance, and/or thermal stability may be desired.

SUMMARY

In one embodiment, a polycrystalline diamond compact includes a polycrystalline diamond body having a working surface, an interface surface, and a perimeter surface. The polycrystalline diamond compact also includes a substrate bonded to the polycrystalline diamond body along the interface surface. A non-diamond volume fraction of the polycrystalline diamond body is greater at the interface surface than at the working surface.

In another embodiment, a polycrystalline diamond compact includes a polycrystalline diamond body having a working surface, an interface surface, and a perimeter surface. The polycrystalline diamond compact also includes a substrate bonded to the polycrystalline diamond body along the interface surface. The polycrystalline diamond body exhibits a concentration of non-catalytic material that is lower at the working surface than at the interface surface.

In yet another embodiment, a method of producing a polycrystalline diamond compact includes assembling a formation cell assembly having diamond particles positioned within a cup, a first substrate having a catalytic material, the first substrate positioned proximate to the diamond particles, and pressure transferring medium surrounding the cup and the first substrate. The method further includes subjecting the formation cell assembly and its contents to a first high pressure high temperature process to sinter the diamond particles in inter-diamond bonds and to form a polycrystalline diamond composite comprising a polycrystalline diamond body that is bonded to the first substrate, where the polycrystalline diamond composite comprises an intermediate-step interface surface positioned proximate to the first substrate and an intermediate-step working surface positioned distally from the first substrate. The method also includes removing substantially all of the first support substrate from the polycrystalline diamond body, leaching at least a portion of accessible catalytic material from the polycrystalline diamond body, positioning the polycrystalline diamond body such that the intermediate-step working surface is positioned proximate to a second substrate, and subjecting the polycrystalline diamond body and the second substrate to a second high pressure high temperature process to bond the polycrystalline diamond body to the second substrate along an interface surface.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

The present disclosure is directed to polycrystalline diamond cutters and drill bits incorporating the same. The polycrystalline diamond cutters include a support substrate and a polycrystalline diamond body that is attached to the support substrate. The polycrystalline diamond body includes a plurality of diamond grains that exhibit inter-diamond bonding. The diamond grains define a plurality of interstitial regions between the individual grains. The interstitial regions between the diamond grains may include materials that were introduced or formed during fabrication of the polycrystalline diamond body, including a non-catalytic material that is distributed throughout the polycrystalline diamond body. The non-catalytic material is present throughout the polycrystalline diamond body in a detectable amount, for example, in an amount detectable by X-ray fluorescence techniques. The polycrystalline diamond cutters may be attached to a rotary drill bit for use in downhole drilling applications. Polycrystalline diamond cutters incorporating non-catalytic material and rotary drill bits incorporating the same are described in greater detail below.

It is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the end user. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, "about 40" means in the range of 36-44.

As used herein, the term "non-catalytic material" refers to an additive that is introduced to the polycrystalline diamond body, and that is not catalytic with carbon in forming diamond and inter-diamond grain bonds. Non-catalytic materials do not include hard-phase materials that may be introduced to the polycrystalline diamond body from the support substrate or reaction products that are formed in the polycrystalline diamond body during the HPHT processes.

Polycrystalline diamond compacts (or "PCD compacts", as used hereafter) may represent a volume of crystalline diamond grains with embedded foreign material filling the inter-granular spaces. In one example, a PCD compact includes a plurality of crystalline diamond grains that are bound to each other by strong inter-diamond bonds and forming a rigid polycrystalline diamond body, and the inter-granular regions, disposed between the bound grains and filled with a non-diamond material (e.g., a catalytic material such as cobalt or its alloys), which was used to promote diamond bonding during fabrication of the PCD compact. Suitable metal solvent catalysts may include the metal in Group VIII of the Periodic table. PCD cutting elements (or "PCD cutter", as is used hereafter) include the above mentioned polycrystalline diamond body attached to a suitable support substrate (for example, cemented tungsten carbide-cobalt (WC—Co)). The attachment between the polycrystalline diamond body and the substrate may be made by virtue of the presence of a catalyst, for example cobalt metal. In another embodiment, the polycrystalline diamond body may be attached to the support substrate by brazing. In another embodiment, a PCD compact includes a plurality of crystalline diamond grains that are strongly bound to each other by a hard amorphous carbon material, for example a-C or t-C carbon. In another embodiment, a PCD compact includes a plurality of crystalline diamond grains, which are not bound to each other, but instead are bound together by foreign bonding materials such as borides, nitrides, or carbides, for example, SiC.

As discussed above, conventional PCD cutters are used in a variety of industries and applications in material removal operations. PCD cutters are typically used in non-ferrous metal removal operations and in downhole drilling operations in the petroleum industry. Conventional PCD cutters exhibit high toughness, strength, and abrasion resistance because of the inter-granular inter-diamond bonding of the diamond grains that make up the polycrystalline diamond bodies of the PCD cutters. The inter-diamond bonding of the diamond grains of the polycrystalline diamond body are promoted during an HPHT process by a catalytic material. However, at elevated temperature, the catalytic material and its byproducts that remain present in the polycrystalline diamond body after the HPHT process may promote back-conversion of diamond to non-diamond carbon forms and may induce stress into the diamond lattice due to the mismatch in the coefficient of thermal expansion of the materials.

It is conventionally known to remove or deplete portions of the catalytic material to improve the thermal stability of the diamond body. The most common method of removing the catalytic material is a leaching process in which the PCD compact is introduced to a leaching medium, for example, an aqueous acid solution. The leaching medium may be selected from a variety of conventionally-known compositions in which the catalytic material is known to dissolve. By dissolving and removing at least a portion of the catalytic material from the PCD compact, the abrasion resistance of the PCD compact may be increased due to the reduction in back-conversion rate of the diamond in the polycrystalline diamond body to non-diamond carbon forms and the reduction in materials having mismatched coefficients of thermal expansion. However, a portion of catalytic material may still remain in the diamond body of the PCD compact that have been subjected to the leaching process. The interstitial regions between diamond grains may form "trapped" or "entrained" volumes into which the leaching medium has limited or no accessibility. Therefore, these trapped volumes remain populated with the constituents of the PCD formation process. The trapped volumes that contain catalytic material contribute to the degradation of the abrasion resistance of the PCD cutter at elevated temperature that is generated during use of the PCD cutter to remove material. Thus, reduction of trapped catalytic material may improve the abrasion resistance of PCD compact cutters.

The present disclosure is directed to polycrystalline diamond cutters that incorporate a non-catalytic material that is distributed throughout the polycrystalline diamond body. The non-catalytic material may be selected from a variety of materials, including metals, metal alloys, metalloids, semiconductors, and combinations thereof. In particular examples, the non-catalytic material may be lead or bismuth. The non-catalytic material may be introduced to the diamond particles prior to or concurrently with the HPHT process. The non-catalytic material may be distributed throughout the polycrystalline diamond body evenly or unevenly, as well as by forming a distribution pattern. The non-catalytic material may reduce the amount of catalytic material that is present in the polycrystalline diamond body following the HPHT process. Further, the non-catalytic material may reduce the amount of catalytic material that is present in the polycrystalline diamond body following a catalyst depletion or leaching process in which both the non-catalytic material and the catalytic material are removed from the portions of the polycrystalline diamond body or from the entire polycrystalline diamond body. Additionally, the non-catalytic material may increase the removal rate (or the "leaching rate") of the catalyst material from the polycrystalline diamond body.

Because of the reduction of the catalytic material in the polycrystalline diamond body, polycrystalline diamond cutters according to the present disclosure exhibit performance that exceeds that of conventional PCD cutters in at least one of toughness, strength, and abrasion resistance.

Figure 1:
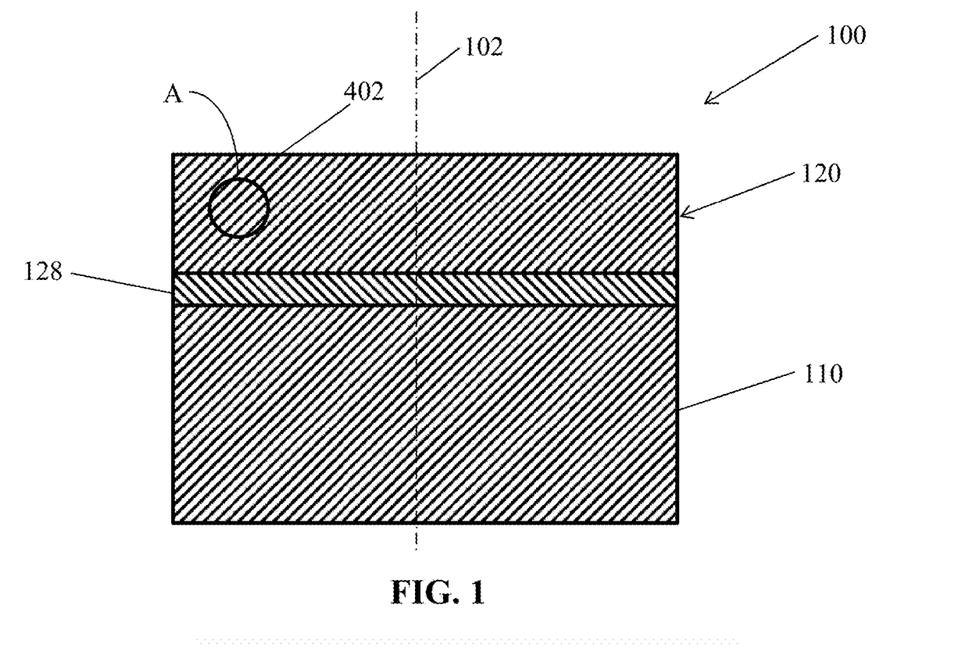
FIG. 1 is a schematic side cross-sectional view of a PCD cutter according to one or more embodiments shown or described herein.
Figure 2:
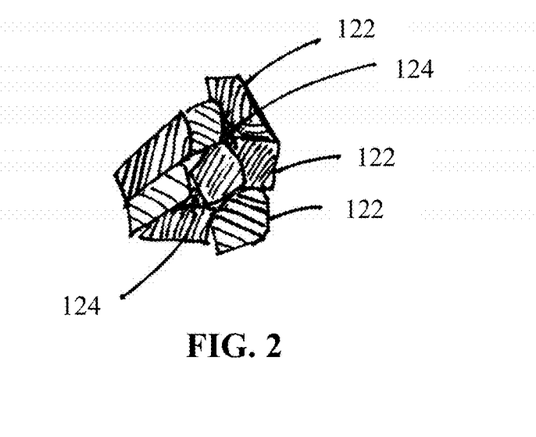
FIG. 2 is a detailed schematic side cross-sectional view of the PCD cutter of FIG. 1A shown at location A.

Referring now to FIGS. 1 and 2, a PCD cutter 100 is depicted. The PCD cutter 100 includes a support substrate 110 and a polycrystalline diamond body 120 that is attached to the support substrate 110. The polycrystalline diamond body 120 includes a plurality of diamond grains 122 that are bonded to one another, including being bonded to one another through inter-diamond bonding. The bonded diamond grains 122 form a diamond lattice that extends along the polycrystalline diamond body 120. The diamond body 120 also includes a plurality of interstitial regions 124 between the diamond grains. The interstitial regions 124 represent a space between the diamond grains. In at least some of the interstitial regions 124, a non-carbon material is present. In some of the interstitial regions 124, a non-catalytic material is present. In other interstitial regions 124, catalytic material is present. In yet other interstitial regions 124, both non-catalytic material and catalytic material is present. In yet other interstitial regions 124, at least one of catalytic material, non-catalytic material, swept material of the support substrate 110, for example, cemented tungsten carbide, and reaction by-products of the HPHT process are present. Non-carbon, non-catalytic or catalytic materials may be bonded to diamond grains 122. Alternatively, non-carbon, non-catalytic or catalytic materials may be not bonded to diamond grains 122.

The catalytic material may be a metallic catalyst, including metallic catalysts selected from Group VIII of the periodic table, for example, cobalt, nickel, iron, or alloys thereof. The catalytic material may be present in a greater concentration in the support substrate 110 than in the polycrystalline diamond body 120, and may promote attachment of the support substrate 110 to the polycrystalline diamond body 120 in the HPHT process, as will be discussed below. The polycrystalline diamond body 120 may include an attachment region 128 that is rich in catalyst material promotes bonding between the polycrystalline diamond body 120 and the support substrate 110. In other embodiments, the concentration of the catalytic material may be greater in the polycrystalline diamond body 120 than in the support substrate 110. In yet other embodiments, the catalytic material may differ from the catalyst of the support substrate 110. The catalytic material may be a metallic catalyst reaction-by-product, for example catalyst-carbon, catalyst-tungsten, catalyst-chromium, or other catalyst compounds, which also may have lower catalytic activity towards diamond than a metallic catalyst.

The non-catalytic material may be selected from a variety of materials that are non-catalytic with the carbon-diamond conversion and include, for example, metals, metal alloys, metalloids, semiconductors, and combinations thereof. The non-catalytic material may be selected from one of copper, silver, gold, aluminum, silicon, gallium, lead, tin, bismuth, indium, thallium, tellurium, antimony, polonium, and alloys thereof.

Both non-catalytic material and catalytic material may be present in a detectable amount in the polycrystalline diamond body of the PCD cutter. Presence of such materials may be identified by X-ray fluorescence, for example using a XRF analyzer available from Bruker AXS, Inc. of Madison, Wis., USA. Presence of such material may also be identified using X-ray diffraction, energy dispersive spectroscopy, or other suitable techniques.

The non-catalytic material may be introduced to the unbonded diamond particles prior to the first HPHT process in an amount that is in a range from about 0.1 vol. % to about 5 vol. % of the diamond body 120, for example an amount that is in a range from about 0.2 vol % to about 2 vol. % of the diamond body 120. In an exemplary embodiment, non-catalytic material may be introduced to the unbonded diamond in an amount from about 0.33 to about 1 vol. %. Following the first HPHT process and leaching, the non-catalytic material content is reduced by at least about 50%, including being reduced in a range from about 50% to about 80%.

In the first HPHT process, catalytic material may be introduced to the diamond powders. The catalytic material may be present in an amount that is in a range from about 0.1 vol % to about 30 vol. % of the diamond body 120, for example an amount that is in a range from about 0.3 vol. % to about 10 vol. % of the diamond body 120, including being an amount of about 5 vol. % of the diamond body 120. In an exemplary embodiment, catalytic material may be introduced to the unbonded diamond is an amount from about 4.5 vol. % to about 6 vol. %. Following the first HPHT process and leaching, the catalytic material is reduced by at least about 50%, including being reduced in a range from about 50% to about 90%.

The non-catalytic material and the catalytic material may be non-uniformly distributed in the bulk of the polycrystalline diamond cutter 100 such that the respective concentrations of non-catalytic material and catalytic material vary at different positions within the polycrystalline diamond body 120. In one embodiment the non-catalytic material may be arranged to have a concentration gradient that is evaluated along a longitudinal axis 102 of the polycrystalline diamond cutter 100. The concentration of the non-catalytic material may be higher at positions evaluated distally from the substrate 110 than at positions evaluated proximally to the substrate 110. In opposite, the concentration of the catalytic material may be greater at positions evaluated proximally to the substrate 110 that at positions evaluated distally from the substrate 110. In yet another embodiment, the concentrations of the non-catalytic material and the catalytic material may undergo a step change when evaluated in a longitudinal axis 192 of the polycrystalline diamond cutter 100. In yet another embodiment, the concentrations of the non-catalytic material and the catalytic material may exhibit a variety of patterns or configurations. Independent of the concentration of the non-catalytic material and the catalytic material in the polycrystalline diamond body 120, however, both non-catalytic material and catalytic material may be detectable along surfaces proximately and distally located relative to the substrate 110.

In another embodiment, the polycrystalline diamond body 120 may exhibit relatively high amounts of the catalytic material at positions proximate to the substrate 110 and at which the catalytic material forms a bond between the polycrystalline diamond body 120 and the substrate 110. In some embodiments, at positions outside of such an attachment zone, the non-catalytic material and the catalytic material maintain the concentration variation described above.

In one embodiment, the polycrystalline diamond cutter 100 may be produced in two HPHT processes. The first HPHT process may sinter the previously unbonded diamond grains 122 to form a polycrystalline diamond body 120 that is attached to a first substrate. The polycrystalline diamond body 120 may include an intermediate interface surface that is positioned proximate to the first substrate and an intermediate working surface that is positioned distally from the first substrate. The polycrystalline diamond body 120 may be detached from the first substrate and reassembled to a second substrate. The polycrystalline diamond body 120 may be inverted its orientation with regard to the second substrate 110 as compared to the first substrate. In such a configuration, the intermediate working surface of the polycrystalline diamond body 120 is positioned proximate to the second substrate 110, while the intermediate interface surface of the polycrystalline diamond body 120 is positioned distally from the second substrate 110.

Processing the components of the PCD cutters 100 such that the polycrystalline diamond body 120 is inverted with regard to the second substrate 110 as compared to the first substrate may be exhibited in the microstructure of the PCD cutters 100. The direction of the "sweep" of catalyst material through the unbonded diamond grains 122 may locally change the properties of the polycrystalline diamond body 120 such that the properties of the polycrystalline diamond body 120 are not uniform. Such properties of the polycrystalline diamond body 120 that may exhibit these local variations may include, for example, diamond density of the polycrystalline diamond body 120, volume of interstitial regions between inter-bonded diamond grains 122, concentration of hard metal swept from the first substrate into the polycrystalline diamond body 120, concentration of non-catalytic material swept along the polycrystalline diamond body 120, and concentration of catalytic metal swept from the first substrate into the polycrystalline diamond body 120. Without being bound by theory, it is believed that these properties may show local variations due to a variety of factors, including comparative melting temperature of the catalyst metal and non-catalyst material, concentration of hard metal and carbon that is dissolved in the catalyst metal, and temperature, pressure, and timing conditions of the HPHT process, among others.

In one embodiment, the diamond density of the polycrystalline diamond body 120 may be greater at the intermediate interface surface than at the intermediate working surface. In another embodiment, the volume of the interstitial regions between inter-bonded diamond grains 122 may be lower at the intermediate interface surface than at the intermediate working surface. In another embodiment, the concentration of non-catalyst material may be lower at the intermediate interface surface than at the intermediate working surface. In another embodiment, the concentration of the catalyst metal, evaluated at a time prior to leaching and at a time subsequent to leaching, may be greater at the intermediate interface surface than at the intermediate working surface. In another embodiment, the concentration of hard metal that is swept from the first substrate may be greater at the intermediate interface surface than at the intermediate working surface.

Because of the local variation in the properties of the polycrystalline diamond body 120, the polycrystalline diamond body 120 may exhibit different mechanical properties that may show variation in the abrasion resistance and/or toughness of the finished PCD cutters 100. Additionally, the polycrystalline diamond body 120 may exhibit variations in the rate of catalyst material removal in a leaching operation. Further, because the polycrystalline diamond body 120 is subjected to a subsequent HPHT process, the bond strength between the second substrate 110 and the polycrystalline diamond body 120 may vary based on the orientation of the polycrystalline diamond body 120 relative to the second substrate 110, because of the microstructural variations between local regions of the polycrystalline diamond body 120.

In some embodiments, the polycrystalline diamond body 120 includes voids between inter-bonded diamond grains 122. The voids may be formed from the interstitial regions 124 that were formed in the HPHT sintering process. In some embodiments, the voids may be substantially free of non-diamond material. In other embodiments, the voids may include a variety of materials including, for example and without limitation, non-catalyst material, catalyst material, hard metal from the first substrate and/or the second substrate, an infiltrated material, or combinations thereof. In one embodiment, the voids may have larger volumes at the interface surface than at the working surface. This configuration of void volumes may be exhibited in a polycrystalline diamond body 120 having a diamond grains 122 with a generally uniform particle size distribution. The void volumes, therefore, may be a result of the dynamics of the HPHT sintering process. In other embodiments, the polycrystalline diamond body 120 includes voids between inter-bonded diamond grains, where the interface surface exhibits a greater quantity of voids than the working surface. In embodiments exhibiting larger void volumes along the interface surface than at the working surface or exhibiting a greater quantity of voids along the interface surface than at the working surface, a non-diamond volume fraction of the polycrystalline diamond body 120 may be greater at the interface surface than at the working surface.

PCD cutters 100 according to the present disclosure may exhibit improved performance as compared to conventionally produced PCD cutters when evaluated in terms of abrasion resistance and/or toughness. The performance of PCD cutters 100 according to the present disclosure may particularly exhibit improved performance when subjected to conditions of elevated temperature. Such conditions may occur when the PCD cutters 100 are used in aggressive material removal operations, for example, aggressive downhole drilling operations in the petroleum industry. Performance of the PCD cutter 100 with respect to abrasion resistance may be quantified in laboratory testing, for example using a simulated cutting operation in which the PCD cutter 100 is used to machine an analogous material that replicates an end user application.

In one example used to replicate a downhole drilling application, the PCD cutter 100 is held in a vertical turret lathe ("VTL") to machine granite. Parameters of the VTL test may be varied to replicate desired test conditions. In one example, the cutter that is subjected to the VTL test is water cooled. In one example, the PCD cutter 100 was positioned to maintain a depth of cut of about 0.017 mm/pass at a cross-feed rate of about 0.17 mm/revolution and a cutter velocity of 122 surface meters per minute. The VTL test introduces a wear scar into the PCD cutter 100 along the position of contact between the PCD cutter 100 and the granite. The size of the wear scar is compared to the material removed from the granite to evaluate the abrasion resistance of the PCD cutter 100. The life of the PCD cutter 100 may be calculated based on the material removed from the granite as compared to the size of the wear scar abrades through the polycrystalline diamond body 120 and into the support substrate 110.

In another example, the PCD cutter 100 is subjected to an interrupted milling test in which the PCD cutter 100 is periodically removes material from a workpiece and then is brought out of contact with the workpiece. The interrupted milling test may evaluate thermal resistance of the PCD cutter 100.

In some embodiments, PCD cutters 100 according to the present disclosure exhibit increased abrasion resistance as compared to conventionally produced PCD cutters. In some embodiments, PCD cutters 100 according to the present disclosure may exhibit at least about 30% less wear with an equivalent amount of material removed from the granite as compared to conventionally produced PCD cutters, including exhibiting about 78% less wear than a conventional cutter, including exhibiting about 90% less wear than a conventional cutter. In some embodiments, the PCD cutters 100 according to the present disclosure may exhibit at least about 30% more material removal from the workpiece as evaluated at the end of life of the PCD cutter as compared to a conventional PCD cutter.

PCD cutters 100 according to the present disclosure exhibit a lower concentration of catalytic material in trapped interstitial regions between the bonded diamond grains as compared to conventionally processed cutters. As discussed above, because the catalytic material that is positioned within the trapped interstitial regions may contribute to back-conversion of the diamond grains to non-diamond forms of carbon. The propensity of the polycrystalline diamond body 120 of the PCD cutter 100 to back-convert to non-diamond forms of carbon may be correlated to the high-temperature abrasion resistance of the PCD cutter 100. Reducing the amount of the catalytic material within the trapped interstitial regions between diamond grains of the polycrystalline diamond body 120 may reduce the rate of back-conversion of the PCD cutter 100. Further, reducing the amount of catalytic material within the trapped interstitial regions between diamond grains of the polycrystalline diamond body 120 may reduce stress that is induced into the diamond lattice caused by a mismatch in the coefficients of thermal expansion of the diamond grains and the catalytic material. Therefore, the reduction in the catalytic material within the trapped interstitial regions between the diamond grains resulting from the introduction of non-catalytic material into the polycrystalline diamond body 120, improves performance of the PCD cutter 100 as compared to conventionally produced PCD cutters.

Still referring to FIG. 1, some embodiments of the PCD cutter 100 include a crown portion 402 that is positioned within the polycrystalline diamond body 120 and along a surface opposite the substrate 110. The crown portion 402 is made from a material that is dissimilar from the material of the polycrystalline diamond body 120 and the support substrate 110. The crown portion 402 may extend into the diamond body 120 from the top surface of the PCD cutter 100. The crown portion 402 may extend to a depth that is less than about 1 mm from the support substrate 110 including being about 300 µm from the support substrate 110. The crown portion 402 may limit the depth that the catalytic material 94 sweeps into the polycrystalline diamond body 120 from the second support substrate 110 during the second HPHT process. The crown portion 402 may provide locally modified material properties of the PCD cutter 100. In one embodiment, the crown portion 402 may include, in addition to the bonded diamond grains and the non-catalytic material and the catalytic material in detectable amounts, a material selected from the group consisting of aluminum, aluminum carbide, silicon, and silicon carbide.

In some embodiments, the polycrystalline diamond body 120 may be free of such materials outside of the attachment region 128.

PDC cutters according to the present disclosure may be fabricated using a so-called "double press" HPHT process. Diamond particles may first be subjected to a first HPHT process to form a polycrystalline diamond compact having a polycrystalline diamond body that is formed through sintering with a catalytic material source. In one embodiment, the catalytic material source is provided integrally with a support substrate (a first support substrate). Substantially all of the support substrate is removed from the polycrystalline diamond body, the polycrystalline diamond body is machined to a desired shape, and the polycrystalline diamond body is leached to remove substantially all of the accessible non-catalytic material and catalytic material from the interstitial spaces of the polycrystalline diamond body. The leached polycrystalline diamond body is subsequently cleaned of leaching debris and bonded to a support substrate in a second HPHT process, thus forming a PCD compact. This PCD compact is subsequently finished according to conventionally known procedures to the final shape desirable for the end user application.

Figure 3:
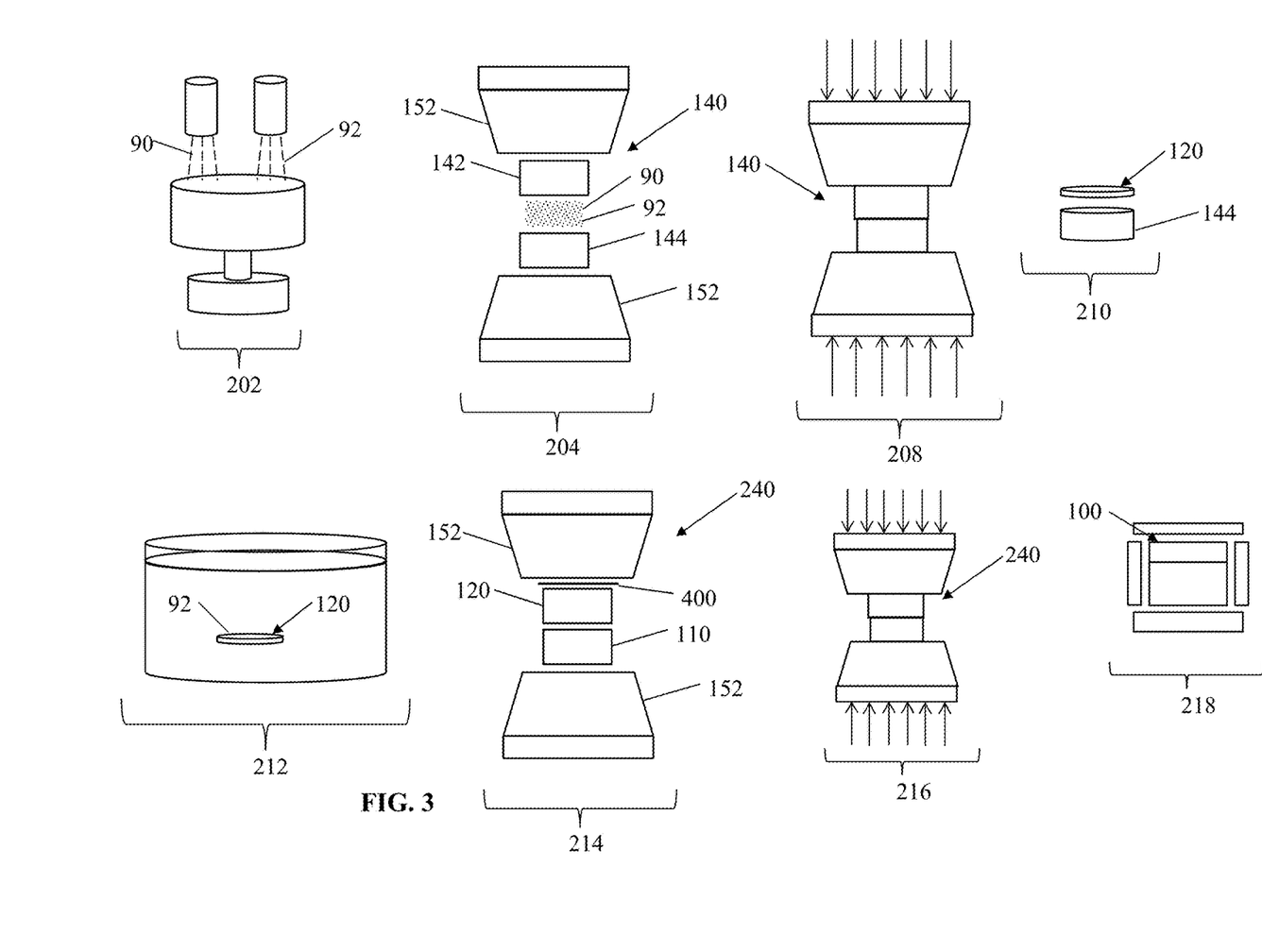
FIG. 3 is a schematic flow chart depicting a manufacturing process of a PCD cutter according to one or more embodiments shown or described herein.

Referring now to FIG. 3, a flowchart depicted the manufacturing procedure 200 is provided. Diamond particles 90 are mixed with the non-catalytic material 92 in step 202. The size of the diamond particles 90 may be selected based on the desired mechanical properties of the polycrystalline diamond cutter that is finally produced. It is generally believed that a decrease in grain size increases the abrasion resistance of the polycrystalline diamond cutter, but decreases the toughness of the polycrystalline diamond cutter. Further, it is generally believed that a decrease in grain size results in an increase in interstitial volume of the PCD compact. The porosity represents the total accessible interstitial space of the polycrystalline diamond body. In one embodiment, the diamond particles 90 may have a single mode median volumetric particle size distribution (D50) in a range from about 10 µm to about 100 µm, for example having a D50 in a range from about 14 µm to about 50 µm, for example having a D50 of about 30 µm to about 32 µm. In other embodiments, the diamond particles 90 may have a D50 of about 14 µm, or about 17 µm, or about 30 µm, or about 32 µm. In other embodiments, the diamond particles 90 may have a multimodal particle size, wherein the diamond particles 90 are selected from two or more single mode populations having different values of D50, including multimodal distributions having two, three, or four different values of D50.

The non-catalytic material 92 may be introduced to step 202 as a powder. In other embodiments, the non-catalytic material 92 may be coated onto the unbonded diamond particles. The particle size of the non-catalytic material may be in a range from about 0.005 µm to about 100 µm, for example being in a range from about 10 µm to about 50 µm.

The diamond particles 90 and the non-catalytic material 92 may be dry mixed with one another using, for example, a commercial TURBULA® Shaker-Mixer available from Glen Mills, Inc. of Clifton, N.J. or an acoustic mixer available from Resodyn Acoustic Mixers, Inc. of Butte, Mont. to provide a generally uniform and well mixed combination. In other embodiments, the mixing particles may be placed inside a bag or container and held under vacuum or in a protective atmosphere during the blending process.

In other embodiments, the diamond particles 90 and the non-catalytic material 92 may be added to a suitable solvent (for example, polyethylene glycol) to form a slurry. The slurry may be continuously mixed to provide an even distribution of the non-catalytic material 92 relative to the diamond particles 90. The solvent may be driven off from the diamond particles 90 and the non-catalytic material 92, for example by spray drying or evaporating in a rotary evaporator under reduced pressure. In some embodiments, the dried slurry results in a well-mixed dry powder of diamond particles 90 and non-catalytic material 92 that is free-flowing.

In other embodiments, the non-catalytic material 92 may be positioned separately from the diamond particles 90. During the first HPHT process, the non-catalytic materials 92 may "sweep" from their original location and through the diamond particles 90, thereby positioning the non-catalytic materials 92 prior to sintering of the diamond particles 90. Subsequent to sweeping of the non-catalytic materials 92, the catalytic material 94 may be swept through the diamond particles 90 during the first HPHT process, thereby promoting formation of inter-diamond bonds between the diamond particles 90 and sintering of the diamond particles 90 to form the polycrystalline diamond body 120 of the polycrystalline diamond compact 80.

The diamond particles 90 and the non-catalytic material 92 may be positioned within a cup 142 that is made of a refractory material, for example tantalum, niobium, vanadium, molybdenum, tungsten, or zirconium, as shown in step 204. The support substrate 144 is positioned along an open end of the cup 142 and is optionally welded to the cup 142 to form cell assembly 140 that encloses diamond particles 90 and the non-catalytic material 92. The support substrate 144 may be selected from a variety of hard phase materials including, for example, cemented tungsten carbide, cemented tantalum carbide, or cemented titanium carbide. In one embodiment, the support substrate 144 may include cemented tungsten carbide having free carbons, as described in U.S. Provisional Application Nos. 62/055,673, 62/055,677, and 62/055,679, the entire disclosures of which are hereby incorporated by reference. The support substrate 144 may include a pre-determined quantity of catalytic material 94. Using a cemented tungsten carbide-cobalt system as an example, the cobalt is the catalytic material 94 that is infiltrated into the diamond particles 90 during the HPHT process. In other embodiments, the cell assembly 140 may include additional catalytic material (not shown) that is positioned between the support substrate 144 and the diamond particles 90. In further other embodiments, the cell assembly 140 may include non-catalytic material 92 that is positioned between the diamond particles 90 and the support substrate 144 or between the diamond particles 90 and the additional catalytic material (not shown).

The cell assembly 140, which includes the diamond particles 90, the non-catalytic material 92, and the support substrate 144, is introduced to a press that is capable of and adapted to introduce ultra-high pressures and elevated temperatures to the cell assembly 140 in an HPHT process, as shown in step 208. The press type may be a belt press, a cubic press, or other suitable presses. The pressures and temperatures of the HPHT process that are introduced to the cell assembly 140 are transferred to contents of the cell assembly 140. In particular, the HPHT process introduces pressure and temperature conditions to the diamond particles 90 at which diamond is stable and inter-diamond bonds form. The temperature of the HPHT process may be at least about 1000° C. (e.g., about 1200° C. to about 1800° C., or about 1300° C. to about 1600° C.) and the pressure of the HPHT process may be at least 4.0 GPa (e.g., about 5.0 GPa to about 10.0 GPa, or about 5.0 GPa to about 8.0 GPa) for a time sufficient for adjacent diamond particles 90 to bond to one another, thereby forming an integral PCD compact having the polycrystalline diamond body 120 and the support substrate 144 that are bonded to one another.

Subsequent to formation of the integral PCD, the polycrystalline diamond body 120 may be separated from the support substrate 144 using a variety of conventionally known techniques, including chemically dissolution and machining techniques, such as grinding, electrical discharge machining, or laser ablation, as shown in step 210. The polycrystalline diamond body 120 may be separated from a majority of the support substrate 144 with a portion of the support substrate 144 remaining integral with the polycrystalline diamond body 120. Following removal of the support substrate 144, the polycrystalline diamond body 120 is machined to a desired shape for subsequent processing. The polycrystalline diamond body 120 may be shaped into a cylindrical shaped disc in which generally planar faces and a generally cylindrical body of the polycrystalline diamond body 120 are formed.

The introduction of the non-catalytic material 92 to the polycrystalline diamond body 120 prior to the first HPHT process may result in a reduction of catalytic material 94 that is present in the polycrystalline diamond body 120 following the HPHT process and prior to initiation of any subsequent leaching process. As compared to conventional cutters that are produced without the introduction of the non-catalytic material 92, unleached diamond bodies 120 produced according to the present disclosure may contain, for example, about 10% less catalytic material 94 when evaluated prior to leaching.

The polycrystalline diamond body 120 may undergo a leaching process in which the catalytic material is removed from the polycrystalline diamond body 120. In one example of a leaching process, the polycrystalline diamond body 120 is introduced to an acid bath to remove the remaining support substrate 144 from the polycrystalline diamond body 120, as shown in step 212. The leaching process may also remove non-catalytic material 92 and catalytic material 94 from the polycrystalline diamond body 120 that is accessible to the acid. Suitable acids may be selected based on the solubility of the non-catalytic material 92 and the catalytic material 94 that is present in the polycrystalline diamond body. Examples of such acids including, for example and without limitation, ferric chloride, cupric chloride, nitric acid, hydrochloric acid, hydrofluoric acid, aqua regia, or solutions or mixtures thereof. The acid bath may be maintained at an pre-selected temperature to modify the rate of removal of the non-catalytic material 92 and the catalytic material 94 from the polycrystalline diamond body 120, including being in a temperature range from about 10° C. to about 95° C. In some embodiments, the acid bath may be maintained at elevated pressures that increase the liquid boiling temperature and thus allow the use of elevated temperatures, for example being at a temperature of greater than about 110° C. The polycrystalline diamond body 120 may be subjected to the leaching process for a time sufficient to remove the desired quantity of non-catalytic material 92 and catalytic material 94 from the polycrystalline diamond body. The polycrystalline diamond body 120 may be subjected to the leaching process for a time that ranges from about one hour to about one month, including ranging from about one day to about 7 days In some embodiments, the polycrystalline diamond body 120 may be maintained in the leaching process until the polycrystalline diamond body 120 is at least partially leached. In polycrystalline diamond bodies 120 that are partially leached, the exterior regions of the polycrystalline diamond bodies 120 that are positioned along the outer surfaces of the polycrystalline diamond bodies 120 have the accessible interstitial regions depleted of non-catalytic material 92 and/or catalytic material 94, while the interior regions of the polycrystalline diamond bodies 120 are rich with non-catalytic material 92 and/or catalytic material 94. In other embodiments, the polycrystalline diamond body 120 may be maintained in the acid bath until complete leaching of the polycrystalline diamond body 120 is realized. Complete leaching of the polycrystalline diamond body 120 may be defined as removal from the polycrystalline diamond body 120 of all of the non-catalytic material 92 and the catalytic material 94 that is accessible to the leaching media.

In some embodiments, the extent of the leaching may be monitored by weighing the polycrystalline diamond body 120 after a pre-defined period of time. As the change in the weight loss of the polycrystalline diamond body 120 approaches a threshold value (for example, 10% loss of the unleached polycrystalline diamond body 120), the polycrystalline diamond body 120 may be considered to be completely leached. Because the polycrystalline diamond body 120 is leached without the support substrate 144, the leach fronts may extend from opposing sides of the polycrystalline diamond body 120 and from the perimeter surface of the polycrystalline diamond body 120. When the leach fronts from the opposing sides of the polycrystalline diamond body 120 meet, the polycrystalline diamond body 120 may be considered to be completely leached. In some embodiments, the extent of leaching may be monitored by the loss of density of the diamond body.

While some diamond bodies 120 may be at least partially leached, reference is made below to a completely leached polycrystalline diamond body 120 to discuss the effects of the addition of the non-catalytic material 92 to the polycrystalline diamond body 120.

In some embodiments, an unleached polycrystalline diamond body may have non-catalytic material 92 and catalytic material 94 at greater than about 4 vol. % of the polycrystalline diamond body 120, including being from about 4 vol. % to about 15 vol. %. In comparison, a completely leached polycrystalline diamond body 120 may have non-catalytic material 92 and catalytic material 94 that is less than about 50% less than the unleached polycrystalline diamond body 120, for example at about 42 vol. % less than the polycrystalline diamond body 120. A completely leached polycrystalline diamond body 120 may have non-catalytic material 92 and catalytic material 94 being from about 0.25 vol. % to about 6 vol. %, for example, being from about 0.2 vol. % to about 1 vol. %. In general, the extent of loss of non-catalytic material and catalytic material in a completely leached polycrystalline diamond body 120 is determined the material structure and composition, for example by the precursor diamond grain size and the particle size distribution.

As discussed above, the introduction of the non-catalytic material to the polycrystalline diamond body 120 reduces the concentration of the catalytic material 94 in the polycrystalline diamond body 120 prior to leaching. The introduction of the non-catalytic material 92 to the polycrystalline diamond body 120 also reduces the concentration of the catalytic material 94 that remains present in the trapped interstitial volumes of the polycrystalline diamond body 120 following complete leaching of the polycrystalline diamond body 120. As compared to conventional cutters that are produced without the introduction of the non-catalytic material 92, diamond bodies 120 produced according to the present disclosure contain from about 30 vol. % to about 90 vol. % less catalytic material 94 following complete leaching of both of the compared diamond bodies.

The introduction of the non-catalytic material 92 to the polycrystalline diamond body 120 may also increase the leaching rate of the polycrystalline diamond body 120, such that the duration of time required to obtain complete leaching of the polycrystalline diamond body 120 is reduced as compared to conventionally produced diamond bodies. For example, complete leaching of the polycrystalline diamond body 120 having non-catalytic material 92 according to the present disclosure may be obtained from about 30% to about 60% less time as compared to conventional cutters that are produced without the introduction of the non-catalytic material 92. In one example, when evaluated after 7 days of introduction to the leaching process, polycrystalline diamond bodies 120 produced according to the present disclosure exhibited from about 40% to about 70% more mass loss than conventional PCD compacts.

Following complete leaching of the polycrystalline diamond body 120, the polycrystalline diamond body 120 continues to exhibit non-diamond components that are present in the trapped interstitial regions of the polycrystalline diamond body 120 that are positioned between bonded diamond grains in at least detectable amounts. However, the reduction of the non-diamond components (including catalytic material 94) in the leaching process accessible interstitial regions reduces the content of catalytic material 94 in the polycrystalline diamond body 120 and increases the thermal stability of the polycrystalline diamond body 120.

Referring again to FIG. 3, the completely leached polycrystalline diamond body 120 is assembled into a second cell in which the polycrystalline diamond body 120 is attached to a support substrate 110 (a second support substrate 110) and optionally a crown precursor material 400, as shown in step 214. The leached polycrystalline diamond body 120 is positioned in an inverted orientation relative to second support substrate 110 as compared to the orientation of the polycrystalline diamond body 120 compared to the first substrate used in the first HPHT process. The polycrystalline diamond body 120 is positioned proximate to the support substrate 110 and assembled into a cell assembly 240. The support substrate 110 may be selected from a variety of hard phase materials including, for example, cemented tungsten carbide, cemented tantalum carbide, or cemented titanium carbide. In one embodiment, the support substrate 110 may include cemented tungsten carbide having free carbons, as described in U.S. Provisional Application Nos. 62/055,673, 62/055,677, and 62/055,679. This second support substrate 110 may be made from the same material as the first support substrate 144 discussed above. Alternatively, the second support substrate 110 may be made from a dissimilar material from the first support substrate 144 discussed above. The support substrate 110 may include a quantity of catalytic material 94. The support substrate 144 may have an intergranular phase liquidus temperature below 1300° C. at high pressure conditions. Using a cemented tungsten carbide-cobalt system as an example, the cobalt is the catalytic material 94 that is infiltrated into the at least partially leached polycrystalline diamond body 120 during a second HPHT process. In other embodiments, the cell assembly 240 may include additional catalytic material (not shown) that is positioned between the support substrate 110 and the polycrystalline diamond body 120. The cell assembly 240 includes pressure transferring medium 152 that at least partially surround the polycrystalline diamond body 120 and the support substrate 110.

The cell assembly 140, which includes the polycrystalline diamond body 120 and the support substrate 110, is introduced to a press that is capable of and adapted to introduce ultra-high pressures and elevated temperatures to the cell assembly 140 in a second HPHT process, as shown in step 216. The pressures and temperatures of the HPHT process that are introduced to the cell assembly 140 are transferred to contents of the cell assembly 140. In particular, the HPHT process introduces pressure and temperature conditions to the polycrystalline diamond body 120 at which diamond phase is thermodynamically stable. In other embodiments, the HPHT process introduces pressure and temperature conditions to the polycrystalline diamond body 120 at which diamond phase is unstable, which may lead to the formation of non-diamond carbon forms. The temperature of the HPHT process may be selected to be above the melting temperature of the infiltrating material. In one embodiment, the HPHT process may be operated at a temperature of at least about 1000° C. (e.g., about 1200° C. to about 1600° C., or about 1200° C. to about 1300° C.) and the pressure of the HPHT process may be at least 4.0 GPa (e.g., about 5.0 GPa to about 10.0 GPa, or about 5.0 GPa to about 8.0 GPa) for a time sufficient for catalyst material 94 to infiltrate the polycrystalline diamond body 120, thereby bonding the polycrystalline diamond body 120 to the support substrate 110 and forming an integral PCD compact 82.

Following formation of the integral PCD compact 82, the PCD compact 82 may be processed through a variety of finishing operations to remove excess material from the PCD compact 82 and configure the PCD compact 82 for use by an end user, including formation of a PCD cutter 84, as shown in step 218. Such finishing operations may include, for example, grinding and polishing the outside diameter of the PCD compact 82, cutting, grinding, lapping, and polishing the opposing faces (both the support-substrate-side face and the diamond-body-side face) of the PCD compact 82, and grinding and lapping a chamfer into the PCD compact 82 between the diamond-body-side face and the outer diameter of the PCD compact 82.

Figure 4:
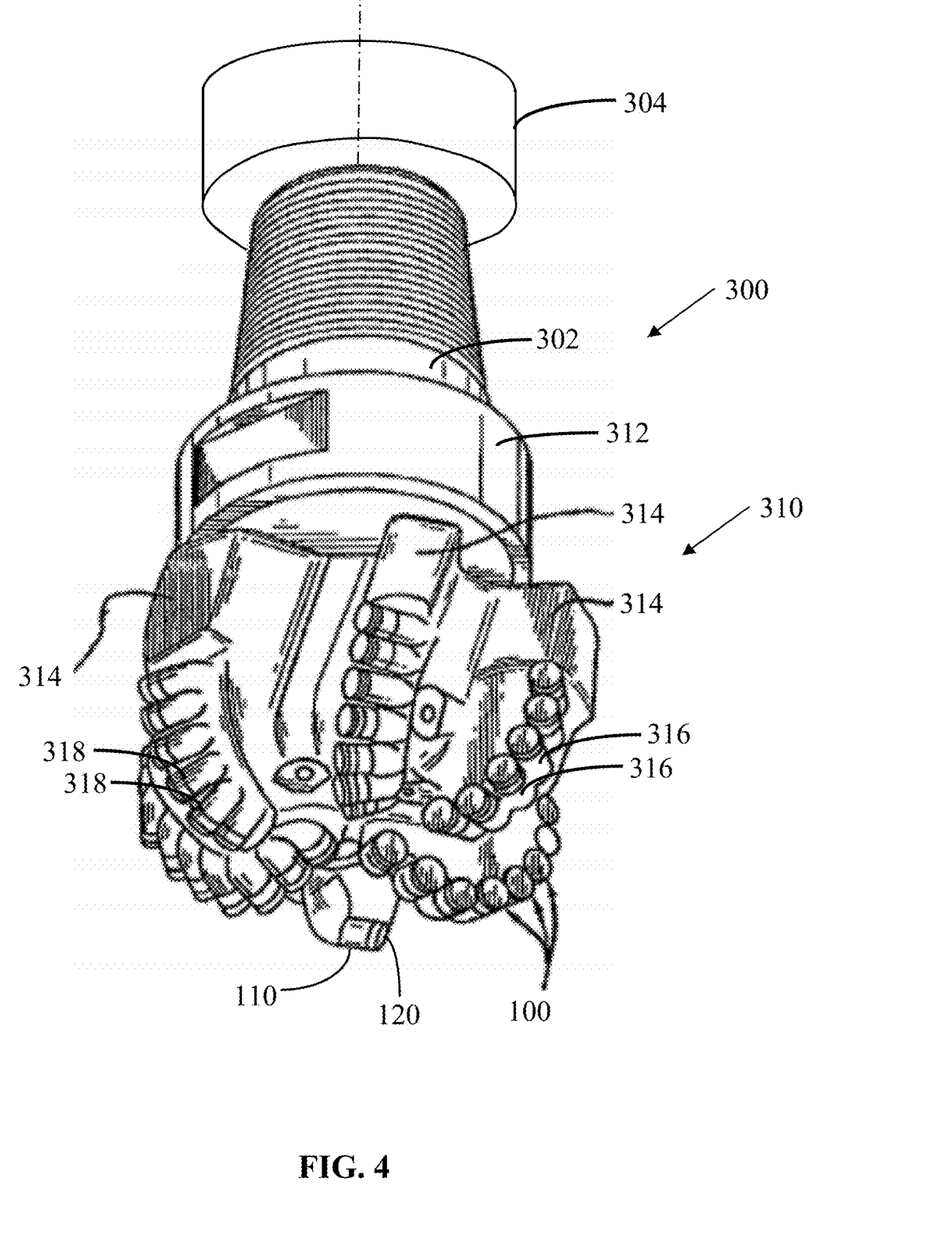
FIG. 4 is a schematic perspective view of a drill bit having a plurality of PCD cutters according to one or more embodiments shown or described herein.

Referring now to FIG. 4, a plurality of PCD cutters 100 according to the present disclosure may be installed in a drill bit 310, as conventionally known, to perform a downhole drilling operation. The drill bit 310 may be positioned on a drilling assembly 300 that includes a drilling motor 302 that applies torque to the drill bit 310 and an axial drive mechanism 304 that is coupled to the drilling assembly for moving the drilling assembly 300 through a borehole 60 and operable to modify the axial force applied by the drill bit 310 in the borehole 60. Force applied to the drill bit 310 is referred to as Weight on Bit" ("WOB"). The drilling assembly 300 may also include a steering mechanism that modifies the axial orientation of the drill assembly 300, such that the drill bit 310 can be positioned for non-linear downhole drilling.

The drill bit 310 includes a stationary portion 312 and a material removal portion 314. The material removal portion 314 may rotate relative to the stationary portion 312. Torque applied by the drilling motor 302 rotates the material removal portion 314 relative to the stationary portion 312. A plurality of PCD cutters 100 according to the present disclosure are coupled to the material removal portion 314. The plurality of PCD cutters 100 may be coupled to the material removal portion 314 by a variety of conventionally known methods, including attaching the plurality of PCD cutters 100 to a corresponding plurality of shanks 316 that are coupled to the material removal portion 314. The PCD cutters 100 may be coupled to the plurality of shanks 316 by a variety of methods, including, for example, brazing, adhesive bonding, or mechanical affixation. In embodiments in which the PCD cutters 100 are brazed to the shanks 316 with a braze filler 318, at least a portion of the shanks 316, the braze filler 318, and at least a portion of the support substrate 110 of the PCD cutter 100 is heated to an elevated temperature while in contact with one another. As the components decrease in temperature, the braze filler 318 solidifies and forms a bond between the support substrate 110 of the PCD cutter 100 and the shanks 316 of the material removal portion 314. In one embodiment, the brazing filler 318 has a melting temperature that is greater than a melting temperature of the non-catalytic material 92 of the polycrystalline diamond body 120 at ambient pressure conditions. In another embodiment, the brazing filler 318 has a melting temperature that is less than the catalytic material 94 of the polycrystalline diamond body 120 at ambient pressure conditions. In yet another embodiment, the brazing filler 318 has a melting temperature that is less than the liquidus temperature of the catalytic material 94 of the polycrystalline diamond body at ambient pressure conditions.

When the drill bit 310 is positioned in the borehole 60, the material removal portion 314 rotates about the stationary portion 312 to reposition the PCD cutters 100 relative to the borehole 60, thereby removing surrounding material from the borehole 60. Force is applied to the drill bit 310 by the axial drive mechanism 304 in generally the axial orientation of the drill bit 310. The axial drive mechanism 304 may increase the WOB, thereby increasing the contact force between the PCD cutters 100 and the material of the borehole 60. As the material removal portion 314 of the drill bit 310 continues to rotate and WOB is maintained on the drill bit 310, the PCD cutters 100 abrade material of the borehole 60, and continue the path of the borehole 60 in an orientation that generally corresponds to the axial direction of the drill bit 310.

The temperature of the PCD cutters 100 may increase with increasing WOB, increasing material removal rates, and increasing cutter wear. As discussed hereinabove, the increase in temperature may contribute to an increase in cutter wear cause by back-conversion of diamond to non-diamond carbon forms. Further, the increase in temperature may increase stresses in the diamond lattice caused by mismatch in the coefficients of thermal expansion of the diamond grains and the catalytic material. In some embodiments, the operating temperature of the PCD cutters 100 at locations proximate to contact with the borehole 60 may have a temperature of greater than about 400° C., including having a temperature of greater than about 500° C., including having a temperature of greater than about 600° C., including have a temperature of greater than about 700° C. In some embodiments, the operating temperature of the PCD cutters 100 at locations proximate to contact with the borehole 60 may be greater than the melting temperature of the non-catalytic material 92 of the polycrystalline diamond body 120.

It should now be understood that PCD cutters according to the present disclosure include a thermally stable polycrystalline diamond body that is coupled to a substrate. The thermally stable polycrystalline diamond body is produced in two HPHT processes. The polycrystalline diamond body is inverted with respect to the substrates of the first and second HPHT processes. The first HPHT process may The thermally stable polycrystalline diamond body has a plurality of diamond grains that define a plurality of interstitial regions between bonded diamond grains. Trapped interstitial regions prevent exposure of the interstitial regions to a leaching medium, such as acid. Non-catalyst material and catalyst material is present in these trapped interstitial regions. The non-catalyst material is distributed throughout the polycrystalline diamond body and is present in a detectable amount throughout the polycrystalline diamond body. The non-catalyst material remains in the polycrystalline diamond body from the manufacturing process. The non-catalyst material results in an increase in the leach rate of the PCD compact and in a reduction of catalyst material that is present in the trapped interstitial regions of the polycrystalline diamond body. The reduction of the catalyst material in the trapped interstitial regions of the polycrystalline diamond body increases the abrasion resistance of the PCD cutter at elevated temperatures.

EXAMPLES

Comparative Example 1

An unleached, single press polycrystalline diamond cutter made without removal and reattachment from the support substrate and having no addition of non-catalytic material was produced in accordance with U.S. patent application Ser. No. 13/926,696, the entire disclosure of which is hereby incorporated by reference, with diamond powder having a 17 µm median particle size being bonded to a cemented tungsten carbide-cobalt support substrate. The cutter pre-cursor materials were subjected to a single HPHT process in which a maximum pressure of about 7 GPa and a maximum temperature of about 1550° C. were reached and the materials were maintained above the melting point of the cobalt catalytic material for about 3 minutes.

Following the HPHT process, the integral PCD compact was finished according to conventional techniques to form a PCD cutter having a diameter of about 16 mm, a height of about 13 mm, and a diamond layer thickness of about 2.1 mm with a chamfer along the top surface of about 0.4 mm by 45 degrees.

The PCD cutter was subjected to a VTL abrasion test with the following conditions:

TABLE 1

| Test condition | Value |
|---|---|
| Cutting Orientation | Continuous Face Turning |
| Cutter Angle | 15 degrees |
| Workpiece | Barre grey granite |
| Depth of cut | 0.017 mm/pass |
| Crossfeed | 0.17 mm/revolution |
| Traverse Rate | 122 surface meters/minute |
| Coolant | Full flood water |
| Duration | 28 dm³ of rock removal |

Figure 5:
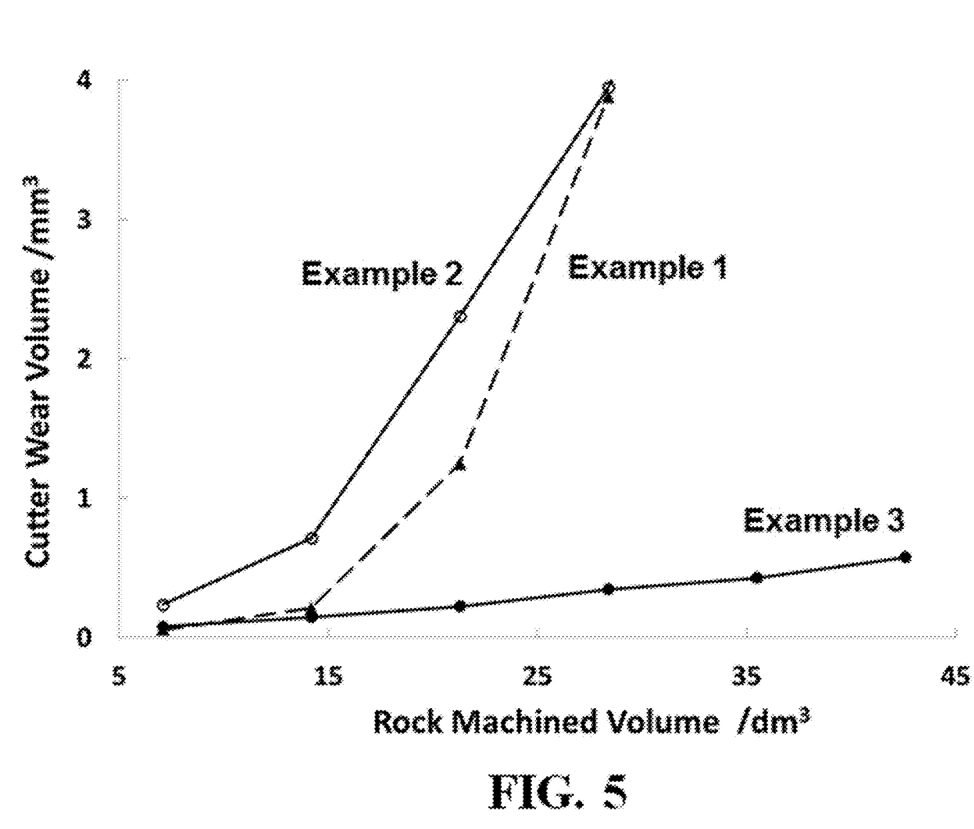
FIG. 5 is a plot of data comparing the wear of PCD cutters according to one or more embodiments shown or described herein.

At the conclusion of the test in which 28 dm³ of material had been removed from the workpiece, the PCD cutter had lost (worn) a volume of 6.04 mm³. A plot comparing the workpiece removal to the PCD cutter wear is depicted in FIG. 5.

Comparative Example 2

A leached, double press polycrystalline diamond cutter made having no addition of non-catalytic material was produced in accordance with U.S. Provisional Pat. Appl. Nos. 62/055,673, 62/055,677, and 62/055,679, with diamond powder having a 17 µm median particle size being bonded to a cemented tungsten carbide-cobalt support substrate. The cutter pre-cursor materials were subjected to a first HPHT process in which a maximum pressure of about 7 GPa and a maximum temperature of about 1600° C. were reached and the materials were maintained above the melting point of the cobalt catalytic material for about 3 minutes.

Following the first HPHT process, a polycrystalline diamond body having a thickness of about 3.5 mm was removed from the hardmetal-cobalt support substrate and the polycdiamond body's catalyst material was substantially removed by immersing the polycrystalline diamond body in an acid solution, as described hereinabove, thereby creating a thermally stable PCD disc. The PCD disc was planarized by lapping to a thickness of about 2.3 mm. The planarized PCD disc was assembled with a second hardmetal support substrate and a source of aluminum, and was introduced to a second HPHT process in which a maximum pressure of about 6 GPa and a maximum temperature of about 1250° C. were reached and the materials were maintained above the melting point of the cobalt catalytic material for about 5 minutes. The resulting PCD compact was finished using conventional techniques to form a PCD cutter having a diameter of about 16 mm, a height of about 13 mm, and a diamond layer thickness of about 2.1 mm with a chamfer along the top surface of about 0.4 mm by 45 degrees.

The PCD cutter was subjected to a VTL abrasion test according to the conditions listed in Table 1 above. At the conclusion of the test in which 28 dm³ of material had been removed from the workpiece, the PCD cutter had lost (worn) a volume of 1.55 mm³. A plot comparing the workpiece removal to the PCD cutter wear is depicted in FIG. 5.

Example 3

Figure 7:
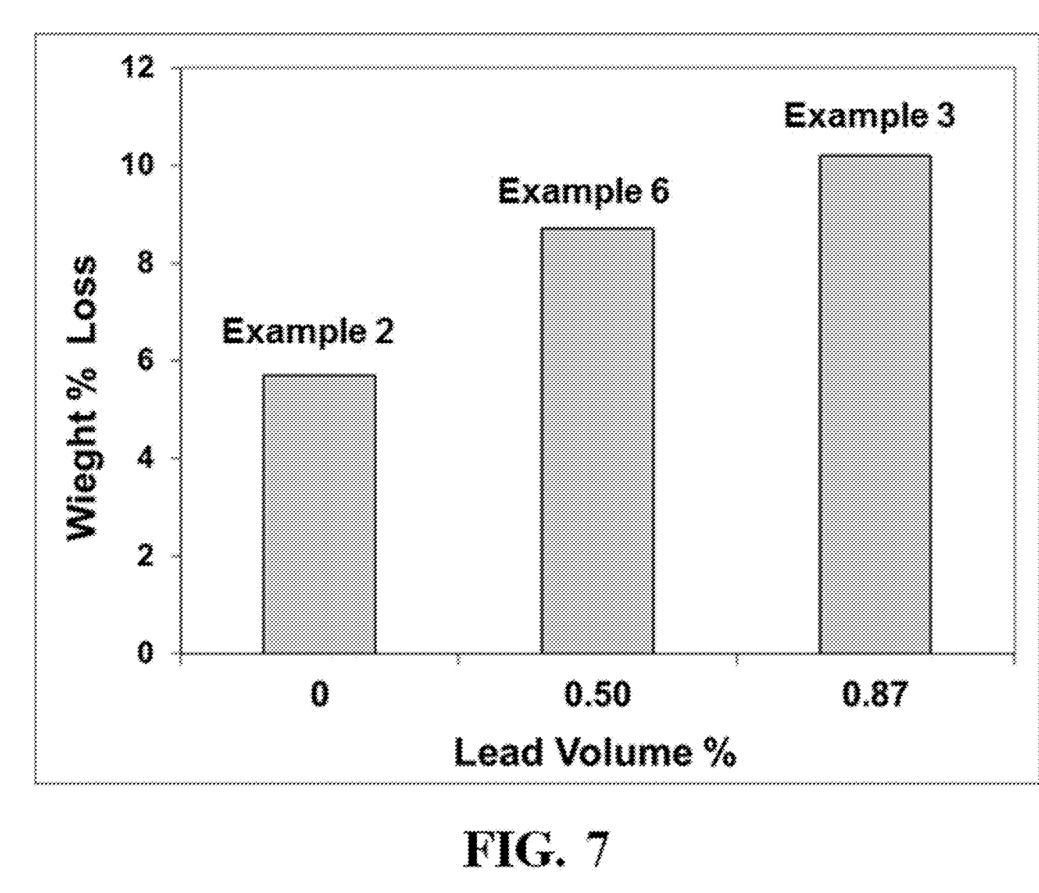
FIG. 7 is a plot of data comparing weight loss of cutters according to one or more embodiments shown or described herein in a leaching process.

Thermally stable polycrystalline diamond cutters according to the present disclosure were produced according to the parameters of Example 2, but with an introduction of about 0.87 vol. % lead addition to the diamond particles prior to the first HPHT process. The lead was about 99% pure and had a median particle size of about 40 µm. The lead and the diamond powder were dry blended for 1 hour using a TURBULA® blender. All other processing and finishing parameters were completed in accordance with Example 2 presented above. The catalytic material removal proceeded to complete leaching of accessible interstitial cavities about 70% faster than the PCD cutter of Example 2. A comparison of the weight loss of the cutter of Example 3 to the cutter of Example 2 evaluated after 7 days in equivalent leaching medium and leaching conditions is depicted in FIG. 7.

The PCD cutter was subjected to a VTL abrasion test according to the conditions listed in Table 1 above. At the conclusion of the test in which 28 dm$^3$ of material had been removed from the workpiece, the PCD cutter had lost (worn) a volume of 0.3 mm$^3$. A plot comparing the workpiece removal to the PCD cutter wear is depicted in FIG. 5.

Comparative Example 4

An unleached, single press polycrystalline diamond cutter made without removal and reattachment from the support substrate and having no addition of non-catalytic material was produced in accordance with Example 1 presented above with the exception that the median particle size of the diamond particles was about 21 µm. All other processing and finishing parameters were completed in accordance with Example 1 presented above.

Figure 6:
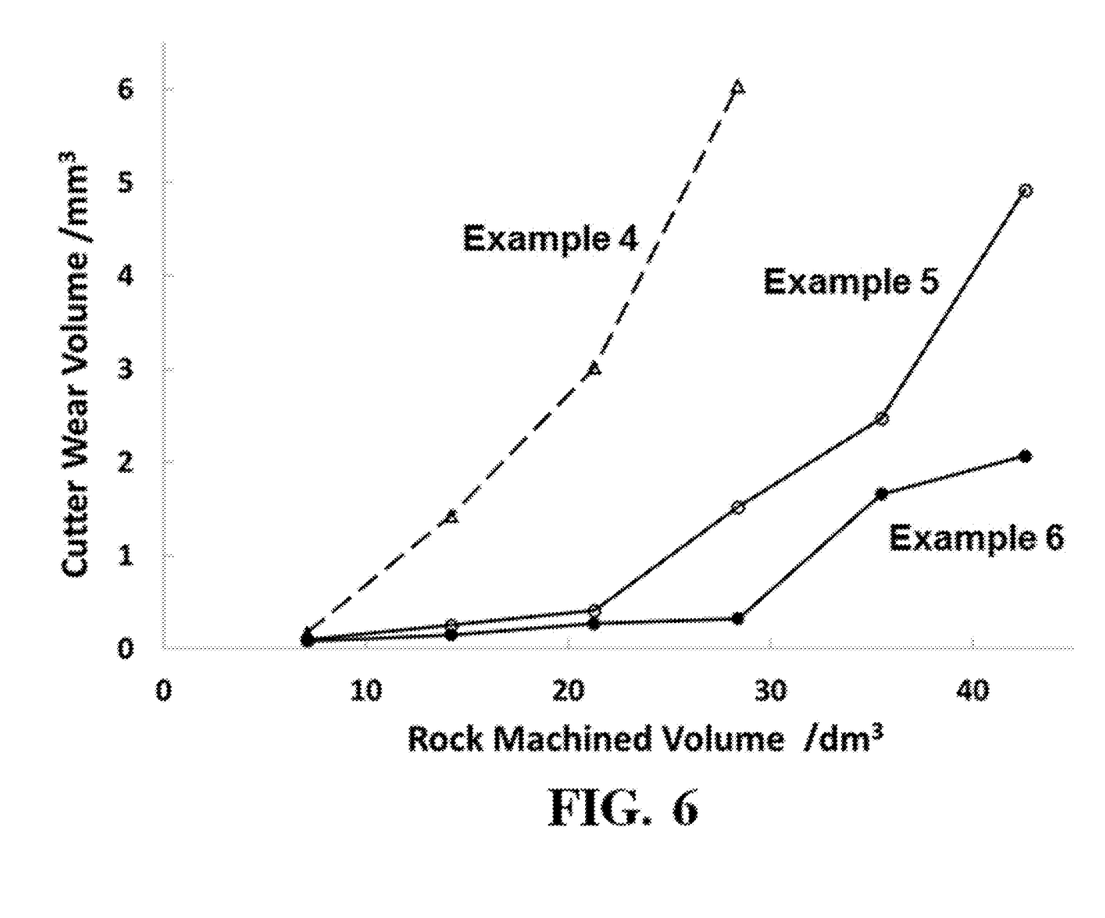
FIG. 6 is a plot of data comparing the wear of PCD cutters according to one or more embodiments shown or described herein.

The PCD cutter was subjected to a VTL abrasion test according to the conditions listed in Table 1 above. At the conclusion of the test in which 28 dm$^3$ of material had been removed from the workpiece, the PCD cutter had lost (worn) a volume of 6.04 mm$^3$. A plot comparing the workpiece removal to the PCD cutter wear is depicted in FIG. 6.

Comparative Example 5

A leached, double press polycrystalline diamond cutter made having no addition of non-catalytic material was produced in accordance with Example 2 presented above with the exception that the median particle size of the diamond particles was about 21 µm. All other processing and finishing parameters were completed in accordance with Example 2 presented above.

The PCD cutter was subjected to a VTL abrasion test according to the conditions listed in Table 1 above. At the conclusion of the test in which 28 dm$^3$ of material had been removed from the workpiece, the PCD cutter had lost (worn) a volume of 1.52 mm$^3$. A plot comparing the workpiece removal to the PCD cutter wear is depicted in FIG. 6.

Example 6

A leached, double press polycrystalline diamond cutter made having an addition of non-catalytic material was produced in accordance with Example 3 presented above with the exceptions that the median particle size of the diamond particles was about 21 µm and the non-catalytic material was about 0.5 vol. % lead addition to the diamond particles prior to the first HPHT process. The catalytic material removal proceeded to complete leaching of accessible interstitial cavities about 40% faster than the PCD cutter of Example 2. A comparison of the weight loss of the cutter of Example 6 to the cutters of Example 2 and Example 3 evaluated after 7 days in equivalent leaching medium and leaching conditions is depicted in FIG. 7. All other processing and finishing parameters were completed in accordance with Example 3 presented above.

The PCD cutter was subjected to a VTL abrasion test according to the conditions listed in Table 1 above. At the conclusion of the test in which 28 dm$^3$ of material had been removed from the workpiece, the PCD cutter had lost (worn) a volume of 0.35 mm$^3$. A plot comparing the workpiece removal to the PCD cutter wear is depicted in FIG. 6.

The results of the examples presented hereinabove are reproduced below in Table 2.

TABLE 2

|  | Diamond Grain Size (µm) | Initial Lead Concentration vol. % | Cutter Wear at 2.8 dm$^3$ of Workpiece Removal (mm3) |
| --- | --- | --- | --- |
| Example 1 | 17 | 0 | 6.04 |
| Example 2 | 17 | 0 | 1.52 |
| Example 3 | 17 | 0.87 | 0.33 |
| Example 4 | 21 | 0 | 3.88 |
| Example 5 | 21 | 0 | 3.95 |
| Example 6 | 21 | 0.5 | 0.35 |

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A polycrystalline diamond compact, comprising:
   a polycrystalline diamond body comprising a working surface, an interface surface, and a perimeter surface; and
   a substrate bonded to the polycrystalline diamond body along the interface surface,
   wherein a non-diamond volume fraction of the polycrystalline diamond body is greater at the interface surface than at the working surface,
   wherein the polycrystalline diamond body exhibits a concentration of non-catalytic material that is lower at the working surface than at the interface surface, and
   wherein the non-catalytic material is selected from the group consisting of lead, bismuth, and alloys, nitrides, carbides and carbonitrides thereof.

2. The polycrystalline diamond compact of claim 1, wherein the substrate is free of the non-catalytic material.

3. The polycrystalline diamond compact of claim 1, wherein the polycrystalline diamond body comprises a uniform particle size distribution of inter-bonded diamond particles.

4. The polycrystalline diamond compact of claim 1, wherein the polycrystalline diamond body comprises voids between inter-bonded diamond grains, and wherein the voids have larger volumes at the interface surface than at the working surface.

5. The polycrystalline diamond compact of claim 1, wherein the polycrystalline diamond body comprises voids between inter-bonded diamond grains, and wherein the interface surface exhibits a greater quantity of voids than the working surface.

6. A polycrystalline diamond compact, comprising:
   a polycrystalline diamond body comprising a working surface, an interface surface, and a perimeter surface; and
   a substrate bonded to the polycrystalline diamond body along the interface surface,
   wherein the polycrystalline diamond body exhibits a concentration of non-catalytic material that is lower at the working surface than at the interface surface, and wherein the non-catalytic material is selected from the group consisting of lead and alloys, nitrides, carbides and carbonitrides thereof.

7. The polycrystalline diamond compact of claim 6, wherein the substrate is free of the non-catalytic material.

8. The polycrystalline diamond compact of claim 6, wherein the polycrystalline diamond body comprises a uniform particle size distribution of inter-bonded diamond particles.

9. The polycrystalline diamond compact of claim 6, wherein the polycrystalline diamond body and the substrate each comprise a catalytic material, and wherein the non-catalytic material has less than about 3 atomic % solubility in the catalyst material.

10. The polycrystalline diamond compact of claim 6, wherein catalytic material from the substrate bonds the polycrystalline diamond body to the substrate.

11. A method of producing a polycrystalline diamond compact, comprising:
assembling a formation cell assembly comprising:
diamond particles positioned within a cup;
a first substrate comprising a catalytic material, the first substrate positioned proximate to the diamond particles; and
pressure transferring medium surrounding the cup and the first substrate;
subjecting the formation cell assembly and its contents to a first high pressure high temperature process to sinter the diamond particles in inter-diamond bonds and to form a polycrystalline diamond composite comprising a polycrystalline diamond body that is bonded to the first substrate, wherein the polycrystalline diamond composite comprises an intermediate-step interface surface positioned proximate to the first substrate and an intermediate-step working surface positioned distally from the first substrate;
removing substantially all of the first support substrate from the polycrystalline diamond body;
leaching at least a portion of accessible catalytic material from the polycrystalline diamond body;
positioning the polycrystalline diamond body such that the intermediate-step working surface is positioned proximate to a second substrate; and
subjecting the polycrystalline diamond body and the second substrate to a second high pressure high temperature process to bond the polycrystalline diamond body to the second substrate along an interface surface wherein the polycrystalline diamond body exhibits a concentration of non-catalytic material that is lower at the working surface than at the interface surface, and wherein the non-catalytic material is selected from the group consisting of lead, bismuth, and alloys, nitrides, carbides, and carbonitrides thereof.

12. The method of claim 11, wherein the polycrystalline diamond body is inverted with respect to the second substrate as compared to the first substrate.

13. The method of claim 11, wherein a non-diamond volume fraction of the polycrystalline diamond body is greater at the interface surface than at the working surface.

14. The method of claim 11, wherein the polycrystalline diamond body comprises voids between inter-bonded diamond grains, and wherein the voids have larger volumes at the interface surface than at the working surface.

15. The method of claim 11, wherein the polycrystalline diamond body comprises voids between inter-bonded diamond grains, and wherein the interface surface exhibits a greater quantity of voids than the working surface.

16. The method of claim 11, wherein the second substrate is free of the non-catalytic material.

17. The method of claim 11, wherein the non-catalytic material is selected from the group consisting of lead, and alloys thereof.

18. The method of claim 11, wherein the non-catalytic material is selected from the group consisting of bismuth and alloys thereof.

19. The method of claim 11, wherein the lead is present in an amount of 0.5 vol. % to 0.87 vol. % of the polycrystalline diamond body.

20. The polycrystalline diamond compact of claim 1, wherein the non-catalytic material is selected from the group consisting of lead and alloys thereof.

21. The polycrystalline diamond compact of claim 1, wherein the non-catalytic material is selected from the group consisting of bismuth and alloys thereof.

22. The polycrystalline diamond compact of claim 1, wherein the lead is present in an amount of 0.5 vol. % to 0.87 vol. % of the polycrystalline diamond body.

* * * * *